US006444952B2

(12) United States Patent
Ballem et al.

(10) Patent No.: US 6,444,952 B2
(45) Date of Patent: Sep. 3, 2002

(54) ENGINE BLOCK HEATER WITH RETAINING MEMBER

(75) Inventors: Steven W. Ballem; Daniel P. McNaught, both of Mississauga (CA)

(73) Assignee: Noma Company, Concord (CA)

( * ) Notice: Subject to any disclaimer, the term of this patent is extended or adjusted under 35 U.S.C. 154(b) by 0 days.

(21) Appl. No.: 09/859,613

(22) Filed: May 17, 2001

Related U.S. Application Data

(60) Provisional application No. 60/204,977, filed on May 17, 2000.

(51) Int. Cl.[7] .................................................. B60L 1/02

(52) U.S. Cl. ....................... 219/205; 219/208; 219/534; 219/536; 123/142.5 E

(58) Field of Search ................................ 219/205, 202, 219/206, 207, 208, 523, 534, 536; 123/196 AB, 549, 142.5 E; 392/497

(56) References Cited

U.S. PATENT DOCUMENTS

| | | | | | |
|---|---|---|---|---|---|
| 1,484,152 | A | | 2/1924 | Pauly et al. | |
| 2,306,709 | A | | 12/1942 | Miller | |
| 2,551,770 | A | | 5/1951 | Smith | |
| 2,766,367 | A | | 10/1956 | Chaustowich | |
| 2,834,864 | A | | 5/1958 | Grinde | |
| 2,937,923 | A | | 5/1960 | Shapleigh | |
| 3,335,459 | A | | 8/1967 | Tyrner | |
| 3,766,356 | A | * | 10/1973 | Feldmann | 219/208 |
| 3,927,301 | A | | 12/1975 | Heuel et al. | |
| 4,175,229 | A | | 11/1979 | Brinkhof et al. | |
| 4,242,564 | A | | 12/1980 | Kendall | |
| 4,286,139 | A | * | 8/1981 | Taylor | 219/208 |
| 4,465,039 | A | * | 8/1984 | Snelgrove et al. | 123/142.5 E |
| 4,480,604 | A | | 11/1984 | Chang et al. | |
| 4,485,771 | A | | 12/1984 | Brinkhof et al. | |
| 4,622,455 | A | | 11/1986 | Schwarzkopf | |
| 4,634,834 | A | * | 1/1987 | Lupoli et al. | 219/208 |
| 4,727,239 | A | * | 2/1988 | Lupoli et al. | 219/208 |
| 4,851,640 | A | * | 7/1989 | Smith | 219/208 |
| 4,901,686 | A | * | 2/1990 | Scott | 123/142.5 E |
| 5,021,633 | A | | 6/1991 | Schaefer | |
| 5,095,193 | A | | 3/1992 | Doyle | |

(List continued on next page.)

FOREIGN PATENT DOCUMENTS

| | | |
|---|---|---|
| DE | 2935430 | 3/1981 |

OTHER PUBLICATIONS

Plastics Materials and Processes, authored by Seymour S. Schwartz and Sidney H. Goodman, Published by Van Nostrand Reinhold Company, 1982; pp. 533–535; 554–557; 865–869.

*Primary Examiner*—Teresa Walberg
*Assistant Examiner*—Fadi H. Dahbour
(74) *Attorney, Agent, or Firm*—Rader, Fishman & Grauer PLLC

(57) ABSTRACT

In accordance with the present invention, a cartridge-style heater received into a bore in an engine block is provided with a quick-release retaining member that attaches to the heater about its outer circumference. A pair of spaced legs and an arm extending from a center portion define the retaining member. The pair of legs frictionally engage the heater while permitting heater to rotate within the bore relative to the member even if the member is fixed to the engine. The rotation also permits the retaining member to rotate about the sleeve to align the retaining member to a predetermined attachment location on the engine independent of the orientation of the heater within the engine bore. This invention provides flexibility in the orientation of the heater to receive an electrical connector from an external power supply and attachment of the heater to the engine regardless of the engine configuration or vehicle model, thereby improving installation, serviceability, and use of the heater.

25 Claims, 3 Drawing Sheets

U.S. PATENT DOCUMENTS 5,117,556 A 6/1992 Schaefer
5,210,393 A 5/1993 Shier
5,538,439 A 7/1996 Fell et al.
5,553,578 A 9/1996 Nguyen
5,567,337 A 10/1996 Edwards et al.
5,584,269 A 12/1996 MacKenzie
6,205,967 B1 * 3/2001 Alvine ................ 123/142.5 E
6,225,893 B1 * 5/2001 Caissie ........................ 219/202
6,232,577 B1 * 5/2001 Reiff .......................... 219/205

* cited by examiner

ENGINE BLOCK HEATER WITH RETAINING MEMBER

RELATED APPLICATION

This application claims priority to U.S. Provisional Application No. 60/204,977, filed on May 17, 2000, the contents of which are incorporated herein in its entirety.

FIELD OF THE INVENTION

The present invention relates to a retaining member for retaining an engine block heater in an engine bore, and more particularly, a quick-release retaining clip, providing freedom of orientation for a cartridge-style heater relative to the engine bore.

BACKGROUND OF THE INVENTION

Dry or cartridge-style heaters are widely adopted for use with automotive engines to warm engine blocks under cold or other inclement environmental conditions.

The dry heater provides a heating element that is received and secured in a bore drilled into the engine block at a location adjacent to a fluid passage or chamber within the engine. The bore serves to locate the heater and to protect the heater from the weather, dirt and grime that often effect an engine during vehicle operation. Once installed inside the bore, the heating element, upon connection to an electrical power source, radiates heats directly to the engine block from contact of the heater with walls that define an outer periphery of the bore. Heat transferred from the heater warms the engine block and ultimately warms the engine fluid (e.g. coolant or oil) within the engine.

Commonly, the heater is equipped with a fastener such as a bolt or a clip that retains the heater in the bore by fastening a portion of the heater extending outside the bore to an exterior surface of the engine block. Under one approach, the heater is commonly provided with a fixed flange that extends from the portion of the heater extending outside the bore. The flange supports an aperture that matches a corresponding aperture located on the surface of the engine block. Upon placement of the heater in the bore, the heater is oriented to align the apertures. A bolt or screw passes through the apertures to mount the flange flush against the exterior surface of the engine, thereby securing the heater in the bore.

Alternatively, the fixed flange is often a clip designed to be snapped over a machined embossment existing on the exterior surface of the engine block adjacent to the engine bore. Upon placement of the heater in the bore, the heater is oriented to align the clip with the embossment. The clip snaps over and frictionally engages the embossment to retain the heater within the bore.

These prior art heater retaining mechanisms often require rigid, fixed connections of the heater within or about the bore. Such connections complicate installation of the heater and removal of heater for repair or replacement. Often, because of the confined areas of the engine compartment, it is difficult for an operator to manipulate tools necessary to secure or remove the heater from the bore. Additionally, the same confined area in the engine compartment makes aligning the heater with the designated area on the engine difficult (e.g. aligning the flange on the heater with the aperture in the engine block to threadedly insert a screw to secure the heater).

Additionally, because the heater must be positioned in the bore in a manner undesirably constrained by the inherent limitations of the fastening mechanism, the orientation of a connector receptacle fixedly attached to the heater to receive an electrical connector supplying power from an external source to activate the heater is often compromised. As may be appreciated, the final orientation of the heater-mounted connector receptacle provided to receive the connection from the external power source is highly dependent upon the rotational orientation of the heater after the heater is mechanically secured in the bore. For example, the location of a fastening aperture or embossment on the engine block may vary significantly between engines, and even between engines of the same type due to manufacturing variances. Thus, the final orientation of the connector receptacle provided on a conventional heater may hamper the ease for a user to interconnect the heater to a connector from an external power source because the connector cannot be easily adapted to the connector receptacle of the heater because of interference between the connector and other engine components. To overcome this problem, multiple electrical connector configurations must be designed and inventoried to adopt to the orientation of the heater's electrical connector receptacle, which varies depending on the heater's retaining requirement within or about the bore and constraints imposed by the engine geometry.

Accordingly, an engine block heater is needed that overcomes the aforementioned difficulties and limitations.

SUMMARY OF THE INVENTION

To overcome the difficulties associated with block heaters, the present invention provides a specialized retaining member for securing a dry cartridge-style engine heater within an engine block of a conventional internal-combustion engine. The heater includes a generally annular cylindrical sleeve supporting an exterior heating surface that is releasably inserted into a bore adjacent to a fluid chamber within the engine block. The sleeve possesses a heating element designed to interconnect with an electrical connector received through a connector receptacle provided in a cap that defines a top portion of the sleeve. The electrical connector provides power from an external power source to operate the heater to warm the engine block and indirectly the fluid contained within the fluid chamber.

A quick-release retaining member attaches to the sleeve about a groove provided in an outer circumference of the sleeve or about the retaining member itself The retaining member is defined by a center portion from which extends a pair of legs. The space between the legs defines a center region designed to receive the sleeve therebetween. An arm, for attaching the retaining member to the engine block, extends from the center portion.

The retaining member is designed for the sleeve to occupy the center region defined by the legs. The legs frictionally engage the outer circumference of the sleeve to connect the heater to the retaining member. Even with the engagement by the legs, the sleeve maintains the ability to rotate between the legs and within the bore, upon the application of sufficient force to overcome the surface friction existing between contacting surfaces of the sleeve, the bore and the retaining member. The sleeve is rotatable even if the retaining member is attached to the engine. Likewise, the same rotatability permits the retaining member to be rotated about the sleeve to align the retaining member to a predetermined location on the exterior surface of the engine independent of the orientation of the heater within the engine bore.

Because the retaining member is not secured to the heater at a rigid, fixed point, the heater may rotate 360 degrees both inside the bore and within the member. The rotation provides freedom of orientation of the connector receptacle of the heater in infinite arrangements for positioning the heater to receive the electrical connector, which provides power to the heater from an external power source. Because of different engine configurations and confined space within engine compartments, flexibility in the orientation of the heater to receive the electrical connector simplifies interconnection between heater and the external power supply regardless of the engine configuration or vehicle model. Moreover, the quick-release nature of the retaining member improves installation and disengagement of the heater from the bore, tasks that could otherwise be difficult and time consuming to accomplish because of the tight confines of the engine compartment and low-observablity of the components therein resulting from the engine block's geometry. Overall, the rotatability of the retaining member provides flexibility, not available with conventional heaters, to orient the heater to connect to the external power source, thereby enhancing accessibility of the heater to the ultimate user.

DETAILED DESCRIPTION

Figure 1:
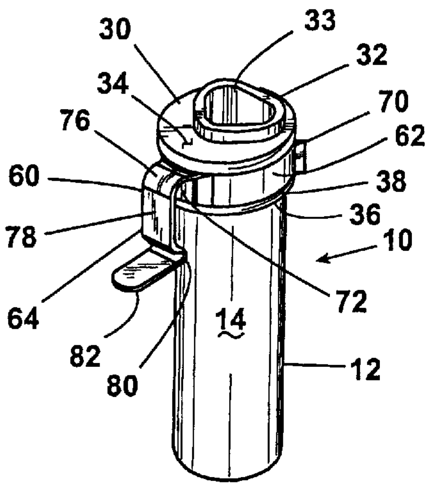
FIG. 1 is a front perspective view of a cartridge-style heater and retaining member.

FIG. 1 shows a generally annular cylindrical dry or cartridge-style heater 10.

Heater 10 comprises a sleeve 12 with exterior walls 14. Sleeve 12 is made of brass, aluminum or any other known heat-conductive material. Exterior walls 14 define an elongated exterior heating surface of heater 10.

Figure 2:
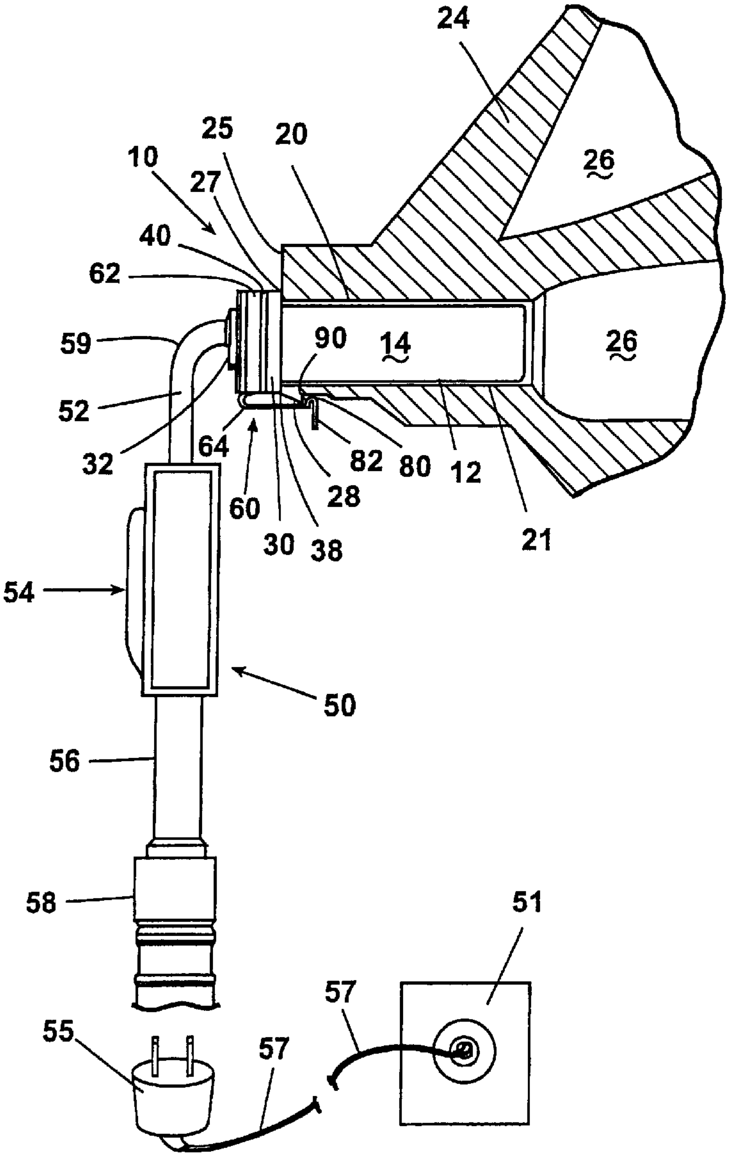
FIG. 2 is an environmental view of the heater and retaining member of FIG. 1 installed in an engine block

As shown in FIG. 2, heater 10 is designed for insertion into an engine bore 20. Bore 20 is milled or formed into engine block 24 with surface walls 21. Bore 20 extends from a perimeter 27 on an outer surface 25 of engine block 24 inward to a location adjacent to or in close proximity to fluid passages or chambers 26 within engine block 24. However, bore 20 does not penetrate fluid chambers 26. The exterior heating surface of sleeve 12 is generally the same shape as bore 20. Sleeve 12 supports a diameter slightly smaller than the diameter of bore 20, permitting sleeve 12 to be releasably inserted therein while providing direct contact between exterior walls 14 and surface walls 21 of bore 20. The contact between surface walls 21 and sleeve 12 provides a frictional surface retainment that assists in maintaining sleeve 12 within the bore and avoiding undesirable spinning of the sleeve that may be caused by engine vibration or vehicle movement. As shown, sleeve 12 is generally annular in shape but it can be appreciated that the heater could take alternative shapes to conform to the engine bore. An embossment 28 is provided about perimeter 27 to provide a location to secure the heater to the engine block.

A cap 30 defines a top portion of sleeve 12. Cap 30 provides a top surface 34, a bottom lip 36 and side walls 38 extending generally perpendicular therebetween. Cap 30 has a diameter that is greater than the diameter of sleeve 12. Upon insertion of sleeve 12 into bore 20, bottom lip 36 rests against outer engine surface 25 about perimeter 27 of bore 20, serving as a stop that prevents the over-insertion of heater 10 within the bore. By providing this stop, cap 30 defines a protruding member for heater 10, providing a grasping point from which an installer may manipulate the heater, thereby eliminating the need to enter the bore to install the heater or retract it from engine block 24 for the propose of repair or replacement.

A connector receptacle 32 axially extends from cap 30 to receive an electrical connector 50 from an external power source 51. Connector receptacle 32 defines an aperture 33 formed in top surface 34 of cap 30. Connector receptacle 32 and aperture 33 share a defined shape with a diameter smaller than the radial diameter of cap 30. In the illustrated embodiment, connector receptacle 32 and aperture 33 are formed in a heart-shaped configuration, but these elements could be formed in any configuration to match electrical connector 50.

Sleeve 12 encases a heating coil. The heating coil generally comprises a metallic tube molded into an U-shaped configuration. A wire runs throughout the tube. A thermally conductive powder, such as magnesium oxide, fills the tube, snugly packed about the wire. Electrical terminals designed to receive electricity from electrical connector 50 extend axially in parallel from each leg of the U-shaped tube and are interconnected by the wire. A metallic material, such as aluminum, is then casted or molded around the tube encasing the tube to form sleeve 12 with cap 30. A machining process may be utilized to smooth or refine the shape of sleeve 12 after casting to adapt sleeve 12 for insertion into bore 20. Alternatively, cap 30 can be forged separately from sleeve 12 and installed upon a top portion of sleeve 12 through known mechanical fastening mechanisms such as threads, set screws, solder, cement, or frictional engagement.

In the illustrated embodiment, electrical connector 50 generally comprises a first conduit 52, a junction box 54, a second conduit 56 and a socket 58. First conduit 52 is a tubular member that extends through connector receptacle 32 carrying a pair of wires. The wires carried in first conduit 52 interconnect with the electrical terminals extending from the heating element inside sleeve 12. First conduit 52 supports an elbow 59 design to orient electrical connector 50 generally parallel and in close proximity to engine block 24 to accommodate the positioning of electrical connector 50 in the generally confined engine compartment. First conduit 52 connects to junction box 54. Inside junction box 54, the wires inside first conduit 52 are spliced with a second set of wires extending from socket 58 through second conduit 56, entering junction box 54 at its opposite end. Junction box 54 provides a convenient location to interconnect the wires leading from the electrical terminals inside sleeve 12 to a wide variety of sockets 58 that conform with varying electrical adopter configurations known in the art. Junction box 54 can also be supplied with components to serve as a surge protector for heater 10 or as a converter to convert the electricity supplied from an external power source to a voltage and/or current required for the operation of the heater. Socket 58 terminates electrical connector 50 providing male terminals to receive a plug 55 on a power cord 57 supplying electrical power from an external power source such as a electrical outlet in a garage or on a generator. Socket 58 is made of plastic, rubber or other insulating material to protect the terminals therein from dirt, grime and the elements. Overall, electrical connector 50 is design to serve as an elongated extension from heater 10 to enable a user easier access to connect heater 10 to the external power supply at a location remote of the heater.

Alternatively, the electrical connector 50 can be reduced to male conductive pins or terminals connected directly to the electrical terminals inside sleeve 12. A plug on a power cord supplying electrical power from the external power supply could be received and retained in connector receptacle 32 and mated with the conductive pins connected to the electrical terminals to form an electrical connection between the heating element and the external power source.

Figure 3:
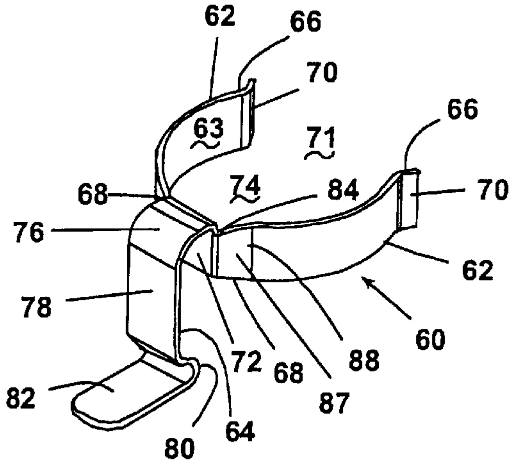
FIG. 3 is a perspective view of the retaining member of FIG. 1.
Figure 4:
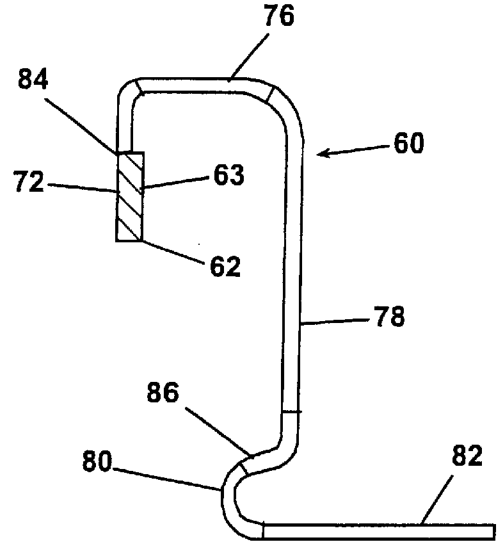
FIG. 4 is a cross section view of the retaining member of FIG. 1.

A quick-release retaining member 60 retains sleeve 12 within bore 20. FIG. 3. shows an illustrated embodiment of retaining member as a spring clip 61 comprising a pair of legs 62 and a retaining arm 64. Legs 62 are generally arcuate and are defined by a first end 66 and a second end 68. First end 66 of each leg 62 terminates in a guide 70 that extends outwards from the arcuate form of legs 62. A gap 71 separates legs 62 at first end 66. Legs 62 extend from a center portion 72 that connects to each leg at second end 68. Arm 64 extends from center portion 72 in a manner that generally places arm 64 generally perpendicular to the plane in which legs 62 reside. Extending from center portion 72, legs 62 define a general circular central region 74 therebetween, which opens into gap 71. Legs 62 are provided with a smooth inside surface 63.

Arm 64 comprises a curved extension 76, a body 78, a retaining lip 80 and a release tab 82. Curved extension 76 interconnects body 78 of arm 64 with a top portion 84 of center portion 72, orientating body 78 generally perpendicular to legs 62. Curved extension 76 arises from top portion 84 of center portion 72 to increase the overall length of arm 64, thereby reducing a spring force generated by arm 64 when attaching or releasing the arm to engine block 24 as to be further described herein. Curved extension 76 connects with retaining lip 80 by body 78. Retaining lip 80 is a curved tight-radius portion of arm 64 that curves towards legs 62 to provide a retaining surface 86 designed to engage embossment 28 on engine block 24. Tab 82 connects to lip 80 to terminate arm 64 in a direction opposite to retaining surface 86 formed by lip 80.

In an unbiased state, central region 74 possesses a radial diameter smaller than the radial diameter of sleeve 12 or cap 30. Guides 70 serve as lead-ins to guide sleeve 12 or cap 30 through gap 71. Because the diameter of sleeve 12 or cap 30 is greater than the diameter central region 74, the insertion of sleeve 12 into circular region 74 biases legs 64, increasing the distance of gap 71 and the diameter of central region 74 to receive sleeve 12. Biased legs 64 frictionally engage the exterior walls 14 of sleeve 12 to retain heater 10 within central region 74. However, the smooth inside surface 63 of legs 62 permits the rotation of sleeve 12 between legs 62 without release therefrom upon application of sufficient force to overcome the frictional basis imparted by the legs. The rotatability of sleeve 12 within retaining member 60 permits connector receptacle 32 to be orientated in any direction, providing flexibility in the placement of electrical connector 50 about engine block 24 within the tight confines of the vehicle's engine compartment.

Figure 6:
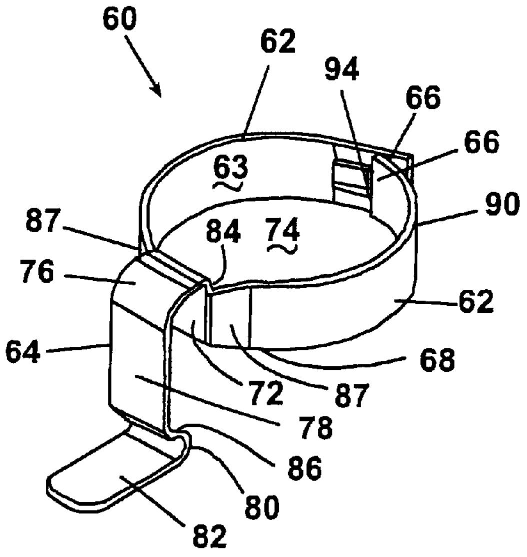
FIG. 6 is a perspective of an alternative embodiment of the retaining member.
Figure 7:
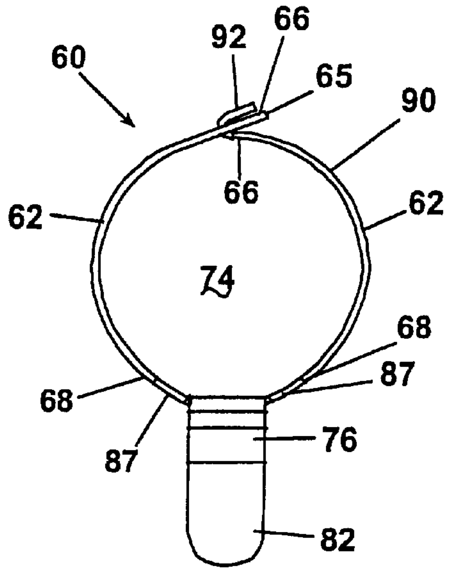
FIG. 7 is a top view of the retaining member of FIG. 6.

As an example of an alternative embodiment, FIGS. 6 and 7 show retaining member 60 as an interconnecting band 90. As with spring clip 61, band 90 comprises a pair of legs 62 and a retaining arm 64. Although structurally similar to clip 61, legs 62 interconnect. To accomplish the interconnection, one first end 66 of one leg 62 terminates in an integrally formed hook 92. The other leg 62 provides a notch 94 pressed through a portion of the width of the leg to receive hook 92. Upon insertion of the sleeve between legs 62, legs 62 frictionally engage and wrap around the exterior walls 14 of sleeve 12 to retain heater 10. Thereupon, hook 92 is received into notch 94 to interconnect legs 62 about the circumference of sleeve 12 or cap 30. This interconnection effectively locks the legs into a loose frictional engagement about the circumference of sleeve 12. Alternatively, band 90 could also be designed with legs 62 integrally formed with interconnecting ends. Such a band 90 would be permanently attached about the circumference of sleeve 12 and would coupled to the sleeve during the manufacturing process either by molding band 90 about the sleeve or securing legs 62 at the interconnecting ends with a spot weld or other fastening method known in the art. Regardless of whether the leg interconnection is permanent or releasable, the interconnection of legs 62 prevents the accidental disengagement of retaining member 60 from the heater and undesirable spinning of the heater within the bore during engine operation. Additionally, because legs 62 are in a loose frictional engagement about the circumference of the sleeve, sleeve 12 is rotatable between the legs upon application of sufficient force to overcome surface contact friction between legs 62 and the surface of sleeve 12. The rotation of sleeve 12 relative to band 90 permits connector receptacle 32 associated with sleeve 12 to be orientated in any direction, providing flexibility in the placement of electrical connector 50 about engine block 24 within the confines the vehicle's engine compartment.

A groove 40 is provided in cap 30 or alternatively on walls 14 of sleeve 12. Groove 40 is a channel about the circumference of cap 30 or walls 14 with a width slightly greater than the width of legs 62. Upon insertion of sleeve 12 into center region 74 for retainment, legs 62 are aligned with groove 40 and inserted into the channel. Groove 40 thereby retains legs 62 preventing slippage of legs 62 longitudinally about sleeve 12 during operation of the engine while permitting the rotation of sleeve 12 within member 60. Alternatively, groove 40 may be channel provided in inside surface 63 of legs 62 designed to receive a raised rail provided about the circumference of sleeve 12 or cap 30. Upon insertion of the rail into the channel in legs 62, slippage of legs 62 longitudinally about sleeve 12 during operation of the engine is equally accomplished while permitting the rotation of sleeve 12 within member 60 as previously discussed herein.

Member 60 is made from a single stamping. From the stamping, legs 62 and arm 64 are bent into their predetermined configuration forming an integral component. To facilitate this manufacturing process, straight sections 87 are provided between center portion 72 and second end 68 of legs 62. In a manufacturing context, straight sections 87 define folding lines 88 that permit legs 62 to be formed with the desired curvature to define central region 74 without weakening the integrity of the interconnection between center portion 72 and legs 62 that may otherwise result. Additionally, straight portions 87 also provide an interference between sleeve 12 and retaining member 60 when attached. Straight portions 87 set legs 62 off from center portion 72, permitting the curvature of legs 62 to uniformly grasp around the circumference of sleeve 12 to enhance the frictional engagement achieved by biased legs 62, which would otherwise be impaired by the presence of center portion 72.

Upon attachment of member 60 to sleeve 12 and the insertion of sleeve 12 within bore 20, member 60 can be rotated about the circumference of heater 10 to place arm 64 adjacent to embossment 28. Because embossment 28 may be located in numerous positions about bore 20 depending on engine configuration, the rotatability of member 60 provides important flexibility in securing the heater to the engine block. Embossment 28 is shaped so that member 60 snaps over or about embossment 28 to retain heater 10 in bore 20. More specifically, arm 64 is biased to extend over embossment 28 to place retaining surface 86 in frictional engagement with a lip or edge 90 of embossment 28. Tab 82 also provides an easily accessible grip point to bias arm 64 for attachment to embossment 28. Tab 82 also provides an easy-to-locate release point to permit the quick disengagement of arm 64 and the removal of heater 10, tasks that could otherwise be difficult and time consuming to accomplish because of the tight confines about the engine in the vehicle engine compartment and low-observablity of the components therein obscured by the engine block's geometry. Moreover, quick release member 60 increases the ease of installation and replacement of heater 10 in a confined engine compartment and decreases the time needed to secure/unsecure heater 10 by eliminating the commonly employed but labor-intensive fastening methods such as screws, bolts, or welds, which require precision tools to affect retention and are difficult to operate in confined areas.

Figure 5:
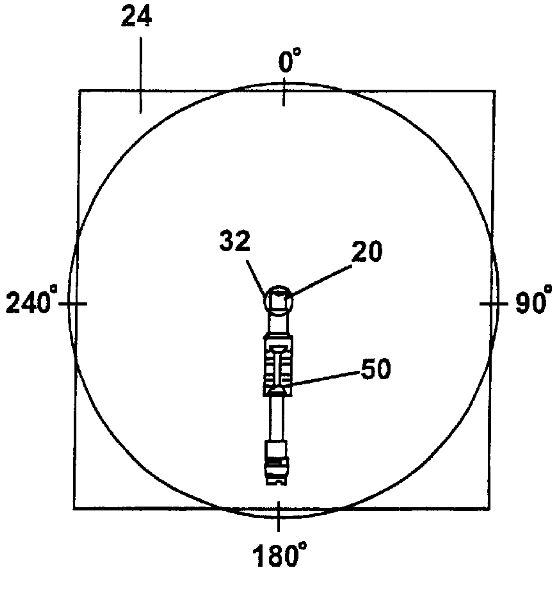
FIG. 5 is an environmental view of an electrical connector to the heater showing its orientation about the engine block.

Because member 60 does not secure heater 10 at a rigid, fixed point, heater 10 can rotate 360 degrees both inside bore 20 and within member 60. As shown in FIG. 5, the rotation provides freedom of orientation in an infinite arrangements for positioning connector receptacle 32 to receive the electrical connector 50, which provides power to the heater. Moreover, because of different engine configurations and confined space within engine compartments, flexibility in the orientation of connector receptacle to receive electrical connector 50 simplifies interconnection between heater 10 and the external power supply regardless of the engine configuration or vehicle model. This enhanced interconnection permits freedom of orientation of electrical connector 50 about the engine to place the connector in a position that avoids other engine components while providing accessibility to the connector for interconnection by the user to an external power source.

The above-described advantages of the heater and retaining member invention are by no means meant to limit the scope of the invention. Though the invention has been described with respect to a single preferred embodiment thereof, many variations and modifications will become apparent to those skilled in the art. It is therefore the intention that the claims be interpreted as broadly as possible in view of the prior art, to include all such variations and modifications.

What is claimed is:

1. An engine block heater for heating an engine block, comprising:

a sleeve having a exterior heating surface releasably insertable into an engine bore and which is capable of connection to an electrical connector providing power from a power source;

a retaining member connectable about a circumference of said sleeve for fastening to the engine block, wherein said retaining member permits said sleeve to rotate within said retaining member to orient with the electrical connector.

2. The heater of claim 1, wherein said sleeve is provided with a cap.

3. The heater of claim 2, wherein a groove is provided on one of said cap or said retaining member to receive said retaining member about said cap.

4. The heater of claim 1, wherein said retaining member comprises a pair of biased legs that frictionally engage said sleeve about a portion of said circumference.

5. The heater of claim 4, wherein said legs terminate in guides.

6. The heater of claim 1, wherein said sleeve is rotatable within the bore.

7. The heater of claim 1, wherein said retaining member is releasably attachable to said sleeve.

8. The heater of claim 1, where said retaining member comprises legs that interconnect about said circumference of said sleeve.

9. An engine block heater for heating an engine block, comprising:

a generally annular cylindrical sleeve having a exterior heating surface releasably insertable into an engine bore in an orientation to receive an electrical connector providing power from a power source;

a retaining member attachable to said sleeve, wherein said retaining member is rotatable about and independent of said orientation of said sleeve for aligning said retaining member adjacent to a predetermined fastening location on the engine block and for attaching said retaining member to the predetermined location for securing said sleeve in the engine bore.

10. The heater of claim 9, wherein a groove is provided on one of said sleeve or said retaining member to receive said retaining member about said sleeve.

11. The heater of claim 9, wherein said sleeve is provided with a cap.

12. The heater of claim 11, wherein a groove is provided on one of said cap or said retaining member to receive said retaining member about said cap.

13. The heater of claim 9, wherein said sleeve has a circumference and said retaining member comprises a pair of biased legs that frictionally engage said sleeve about a portion of said circumference.

14. The heater of claim 13, wherein said legs terminate in guides.

15. The heater of claim 9, wherein said sleeve is rotatable in the bore to receive the electrical connector.

16. The heater of claim 9, wherein said retaining member is releasably attachable to said sleeve.

17. The heater of claim 9, where said retaining member comprises legs that interconnect about a circumference of said sleeve.

18. A retaining member for a heater used to warm an engine block comprising, a pair of spaced legs;

a center region defined by said pair of legs, wherein said center region is capable of receiving the heater in a frictional engagement between said pair of legs;

an arm extending from said pair of legs releasably attachable to the engine block, wherein said pair of legs is rotatable about the heater to orient said arm for attachment to the engine block.

19. The retaining member of claim 18, wherein said pair of legs interconnect with said arm through a center portion that cause an interference that enhances said frictional engagement between said pair of legs and the heater.

20. The retaining member of claim 18, wherein said arm provides an engagement surface for engaging the engine block.

21. The retaining member of claim 18, wherein said arm provides a quick-release tab.

22. The retaining member of claim 18, wherein said pair of legs interconnect about the heater.

23. The retaining member of claim 18, wherein said legs terminate in guides.

24. A retaining member for a heater used to warm an engine block comprising, a pair of spaced legs;

a center region defined by said pair of legs, wherein said center region is capable of receiving the heater in a frictional engagement between said pair of legs;

an arm extending from said pair of legs releasably attachable to the engine block, wherein said pair of legs is rotatable about the heater to orient said arm for attachment to the engine block and wherein the heater is rotatable between said pair of legs for orienting the heater for connection to an electrical connector from a power source.

25. An engine block heater for heating an engine block, comprising:

a sleeve having an exterior heating surface releasably insertable into an engine bore and which is capable of connection to an electrical connector providing poser from a power source;

a retaining member connectable about a circumference of said sleeve for fastening to the engine block, wherein said retaining member permits said sleeve to rotate within said retaining member to orient with the electrical connector; and wherein a groove is provided on one of said sleeve or said retaining member to receive said retaining member about said sleeve.

* * * * *